United States Patent [19]

Hartman et al.

[11] Patent Number: 5,265,486
[45] Date of Patent: Nov. 30, 1993

[54] PORTABLE EXTERNAL DRIVE ASSEMBLY

[75] Inventors: Kenneth E. Hartman, Nashville; Daniel M. O'Neill, Smyrna, both of Tenn.

[73] Assignee: AMMCO Tools Technology Corporation, Wilmington, Del.

[21] Appl. No.: 917,902

[22] Filed: Jul. 21, 1992

Related U.S. Application Data

[63] Continuation of Ser. No. 588,155, Sep. 26, 1990.

[51] Int. Cl.$^5$ .......................... F16H 1/12; B23B 3/22; B25J 5/00
[52] U.S. Cl. ...................................... 74/416; 82/112; 248/278; 901/1; 901/48
[58] Field of Search .................. 74/416, 417, 479; 901/1, 23, 26, 41, 48; 82/112; 248/129, 278, 291

[56] References Cited

U.S. PATENT DOCUMENTS

| | | | |
|---|---|---|---|
| 2,357,803 | 9/1944 | Barrett | 82/112 X |
| 2,868,558 | 1/1959 | Krauss | 248/129 X |
| 4,068,536 | 1/1978 | Stackhouse | 74/417 |
| 4,163,538 | 8/1979 | Galione | 248/278 |
| 4,181,465 | 1/1980 | Ridderstrom | 901/23 X |
| 4,336,730 | 6/1982 | Kopecko et al. | 82/4 A |
| 4,365,928 | 12/1982 | Baily | 901/26 X |
| 4,388,846 | 6/1983 | Kopecko et al. | 82/112 |
| 4,493,231 | 1/1985 | Wössner | 82/112 |
| 4,626,165 | 12/1986 | Nakashima et al. | 901/26 X |
| 4,854,199 | 8/1989 | Norman | 82/112 |
| 4,922,782 | 5/1990 | Kawai | 901/26 X |
| 5,016,489 | 5/1991 | Yoda | 901/23 X |
| 5,020,278 | 6/1991 | St. Angelo, Jr. et al. | 901/41 X |

FOREIGN PATENT DOCUMENTS

| | | | |
|---|---|---|---|
| 1-210280 | 9/1989 | Japan | 901/23 |
| 2133770 | 9/1984 | United Kingdom | 901/23 |

OTHER PUBLICATIONS

Vacula Automtoive Products Inc. publication for a barke lathe.

Primary Examiner—Leslie A. Braun
Assistant Examiner—David W. Laub
Attorney, Agent, or Firm—Patnaude, Videbeck & Marsh

[57] ABSTRACT

An electrically operated drive assembly for turning a motor vehicle disc brake rotor while the rotor is still on the vehicle includes a portable stand or base having a combination electric motor and adjustable drive shaft assembly pivotally mounted thereon. The end of the drive shaft is selectably releaseably retained on a lug adapter mechanism that is retained on the motor vehicle wheel lugs. The drive shaft assembly includes a right angle bend that allows the entire drive assembly to be positioned to one side of the motor vehicle wheel hub and rotor assembly. This arrangement allows a mechanic to have open access to a separate portable brake lathe which is mountable on the vehicle brake caliper mounting bosses. The drive assembly turns the brake rotors at a predetermined speed which is suitable for combined operation with a portable brake lathe.

6 Claims, 5 Drawing Sheets

PORTABLE EXTERNAL DRIVE ASSEMBLY

This is a continuation of copending application Ser. No. 07/588,155 filed on Sep. 26, 1990.

BACKGROUND OF THE INVENTION

This invention relates generally to an external drive assembly for use in automotive repair and maintenance, and more particularly, to an external drive assembly for rotating a disc brake rotor as part of an on-vehicle disc brake rotor resurfacing lathe assembly.

The maintainability of automobile disc brake assemblies has been enhanced by the use of on-vehicle portable brake rotor resurfacing lathes. One such on-vehicle disc brake lathe is shown at U.S. Pat. No. 4,854,199, assigned to the Assignee of the present application. Another such portable brake lathe is shown and described at U.S. Pat. No. 4,388,846. With such a lathe mounted on the brake caliper mounting bosses, the disc brake rotors may be resurfaced without removing them from their respective wheel hub assemblies. Such portable brake lathe assemblies provide for substantial space saving in repair facilities. Also, some wheel rotors are not removable without destroying wheel bearings. Stationary brake lathes have a tool feeding mechanism which provides for a constant tool feed speed when the object being machined is turned at a constant predetermined rotational speed. Except for all-wheel drive trucks and cars, present day motor vehicles have at least some wheels thereon which are not driven by the vehicle's engine. Therefore, there is a need for an external rotational drive source for use in connection with portable disc brake resurfacing lathes in order to drivingly rotate the rotors on the wheel assemblies which are not the driving wheels of the motor vehicle. Such external drive units should also be utilized with the driven wheels of the motor vehicle to impart a constant predetermined rotational speed to the rotors while resurfacing same. Such a constant rotational speed helps assure uniform machine finish across the rotor braking surface. Such a drive unit is shown in FIG. 3 of U.S. Pat. No. 4,336,730. That drive unit is shown to be stationary, and includes a pair of universal joints for providing adjustability between the electric motor output and the wheel hub assembly. The drive unit shown does not provide much flexibility in positioning the automobile wheel being worked on, and it also bisects, or divides into two, the area which the mechanic has available for working on the rotors.

A need has developed for a portable drive assembly that provides external rotational force to any one of a motor vehicle wheel assemblies for resurfacing a disc brake rotor thereon.

It is therefore an object of the present invention, generally stated, to provide a new and improved external drive assembly for use in connection with on-vehicle disc brake rotor resurfacers.

SUMMARY OF THE INVENTION

The invention is directed to a drive assembly for providing external rotational power to a motor vehicle. The drive assembly includes a drive unit having a motor as a part thereof for providing rotational force, and a drive shaft assembly in driven engagement with the motor for imparting rotational force output to the vehicle wheel hub assembly. The assembly also includes a base or stand on which the drive unit is mounted. The invention resides in an improvement comprising a pivotal mounting defining a yoke on the drive unit with at least a substantial portion of the motor being mounted on one side of the pivotal mounting, and at least a substantial portion of the drive shaft assembly positioned on the opposing side of the pivotal mounting. The pivotal mounting is selectably adjustable for providing movement of the drive unit in a first plane. The drive shaft assembly includes selectively adjustable means for changing the direction of rotational force of the drive unit outside of that first plane.

BRIEF DESCRIPTION OF THE DRAWINGS

The features of the present invention, which are believed to be novel, are set forth with particularity in the appended claims. The invention may best be understood by reference to the following description taken in conjunction with the attached sheets of drawings in the several figures of which like reference numerals identify like elements, and in which:

DETAILED DESCRIPTION OF THE PREFERRED EMBODIMENTS

Figure 1:
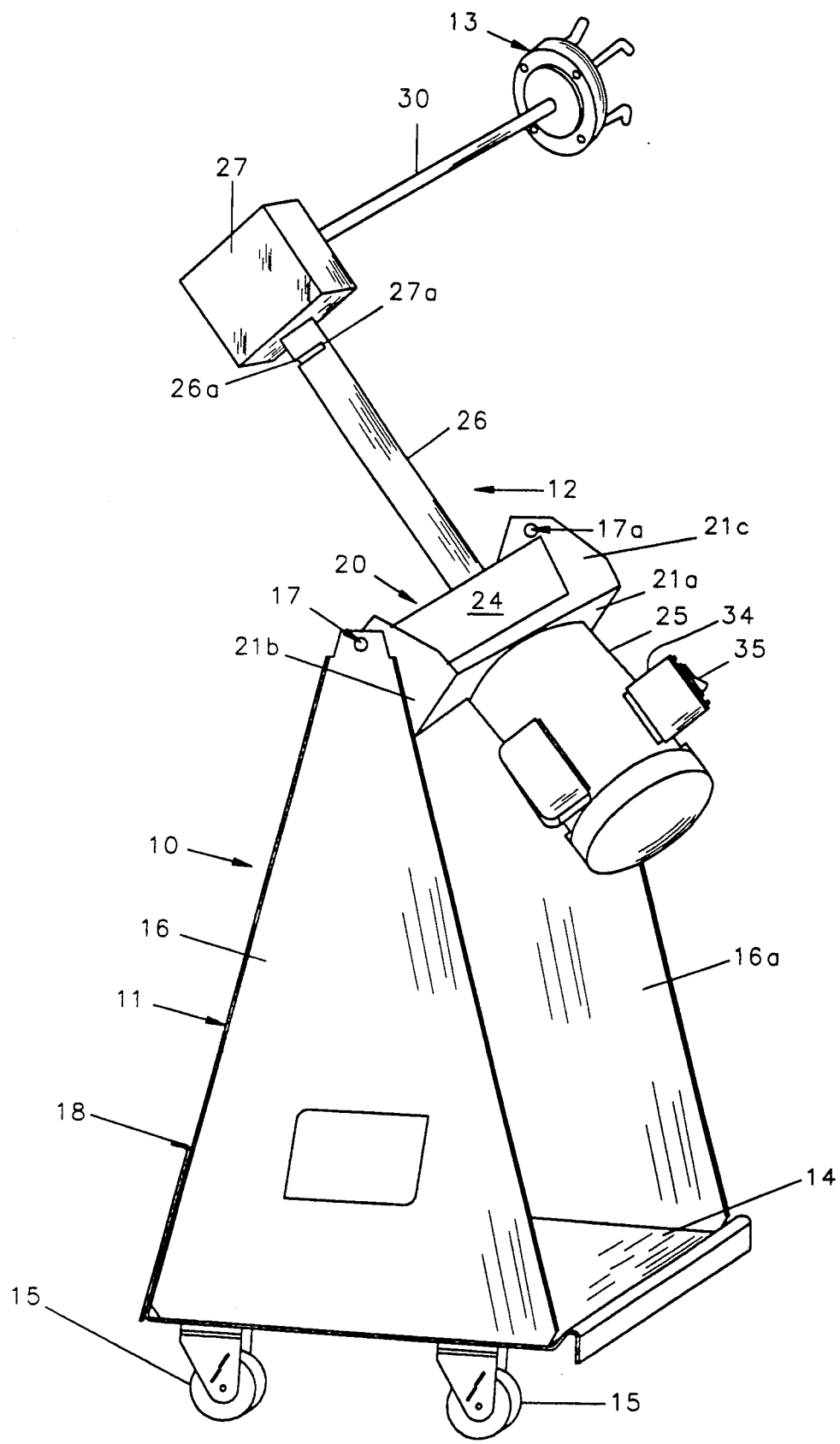
FIG. 1 is a perspective view of the portable external drive assembly constructed in accordance with the present invention.

Referring to FIG. 1, a rotor driving unit generally indicated at 10, constructed in accordance with the present invention includes a portable base 11 and an electric motor and drive shaft assembly 12 which is pivotally mounted adjacent the top of the base 11. The electric motor and drive shaft assembly 12 is drivingly connected to a motor vehicle wheel lug adaptor 13, which is selectably adjustably attachable to a wide variety of vehicle wheel hub assemblies.

Figure 3:
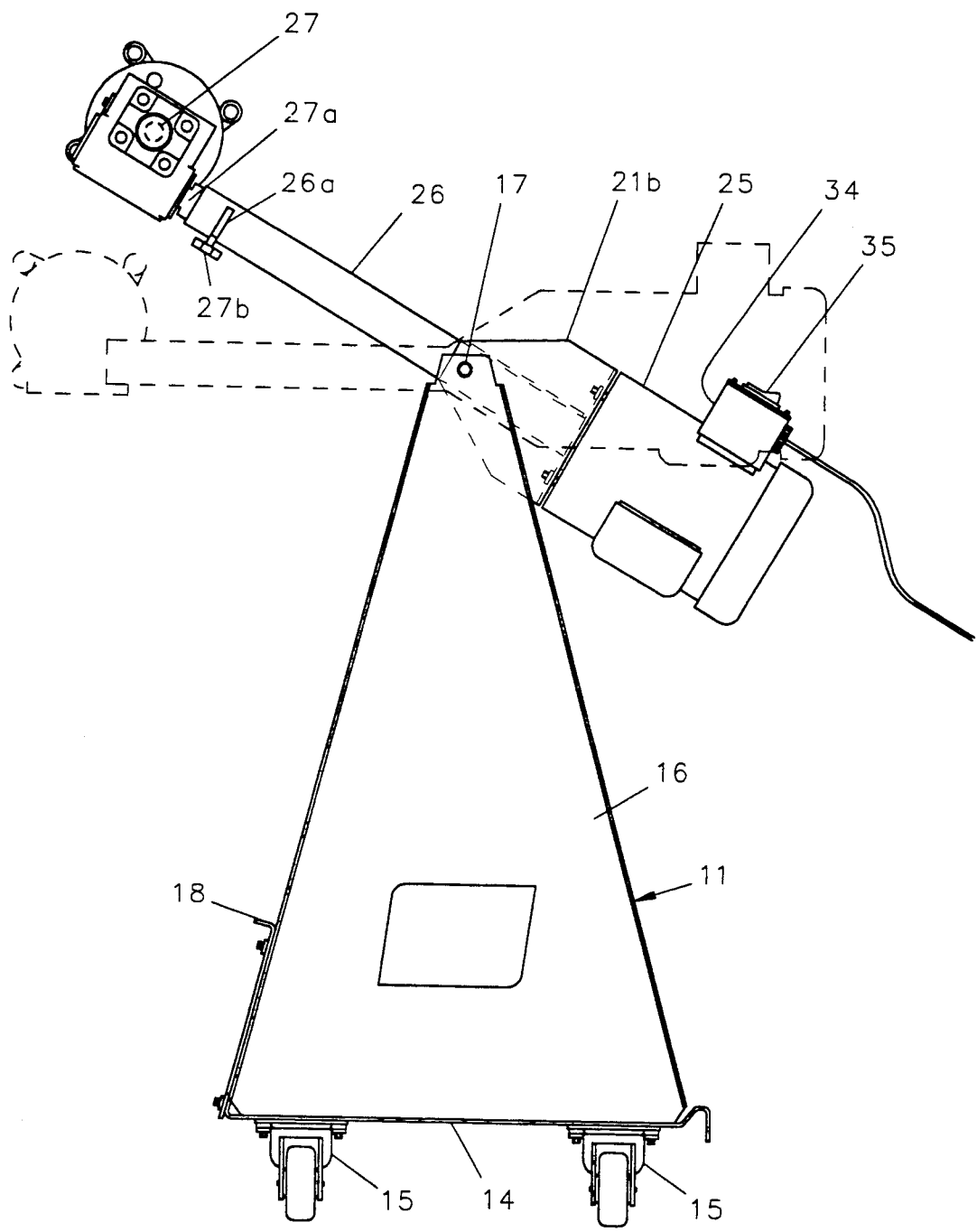
FIG. 3 is an end elevational view of the portable drive assembly showing the pivotal mounting of the electric motor-drive shaft assembly on the base, with the drive assembly shown in pivoted position in dotted line.
Figure 4:
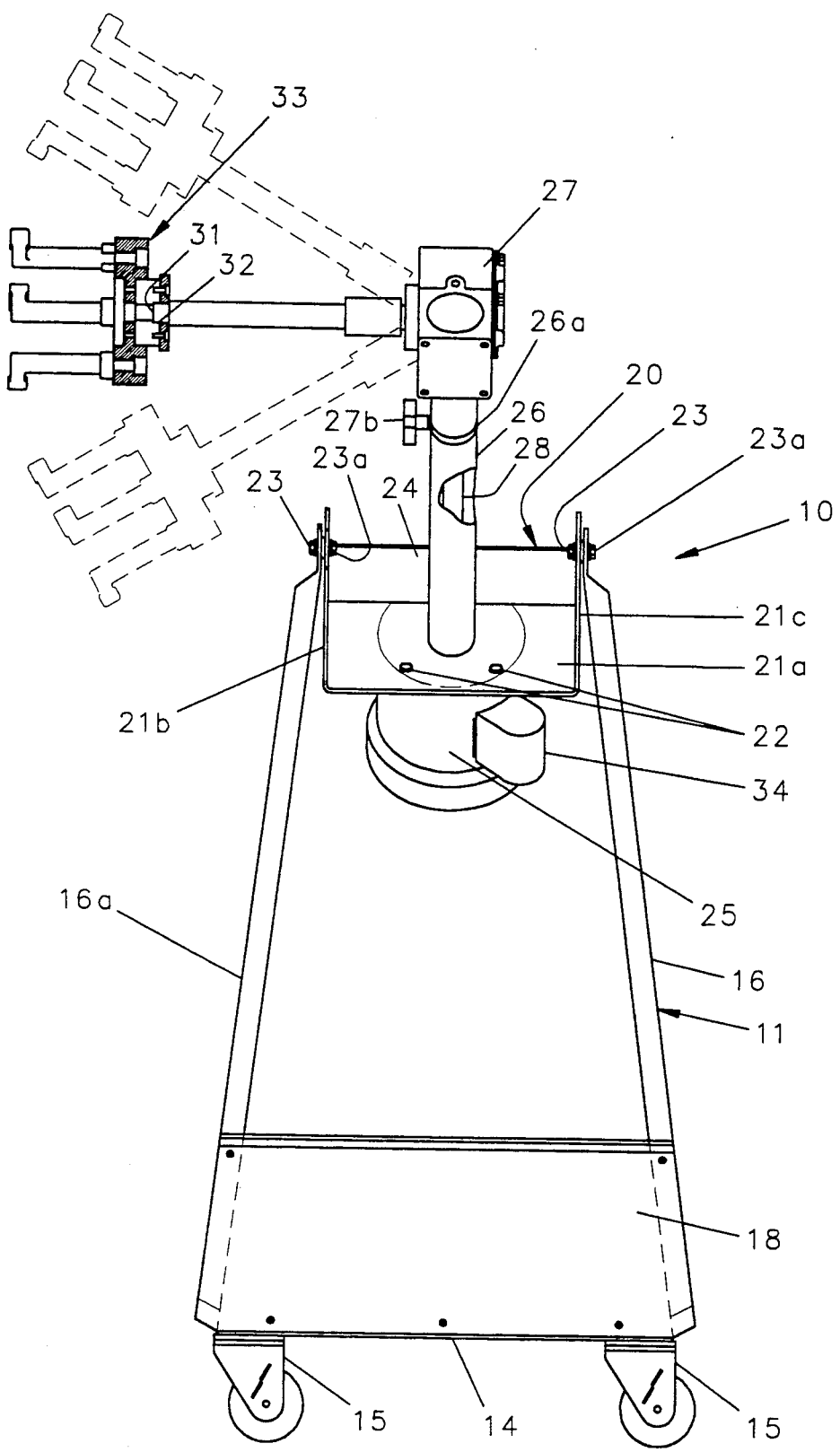
FIG. 4 is a back elevational view of the portable drive assembly of the present invention, with the rotatable gear box, second drive shaft and hub adapter shown in partially rotated positions in dotted line.
Figure 5:
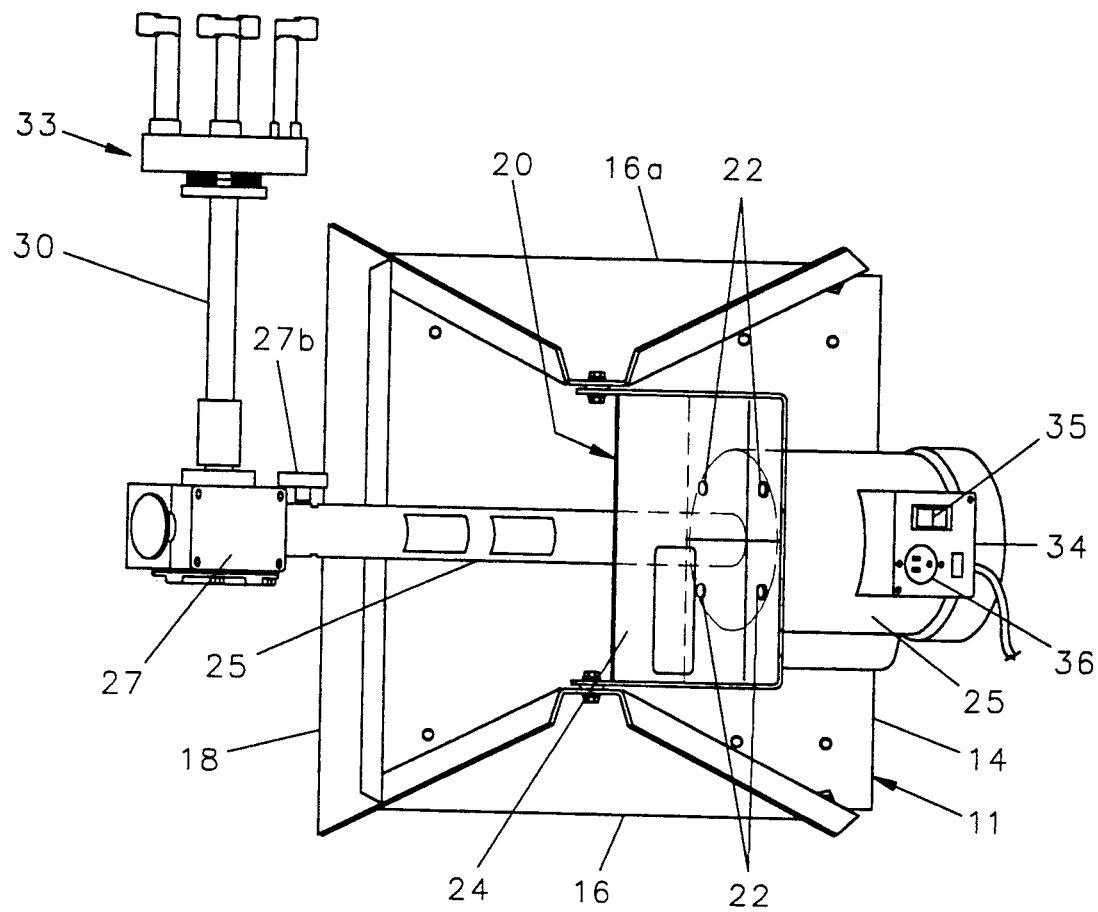
FIG. 5 is a top plan view of the portable drive assembly.

Referring to FIGS. 3, 4 and 5, the portable base 11 is preferably made of metal, although it could be made of fiber glass, plastic, or the like, and includes a generally flat bottom wall or floor 14 which is substantially square in the preferred embodiment having a castor wheel assembly 15—15 mounted on the bottom side of the wall adjacent each corner thereof for providing ease of portability or movement of the external drive unit of the present invention. A pair of generally triangular side panels 16-16a extend upwardly from the opposed sides of the bottom wall or floor 14 with each including adjacent the top thereof, a pivotal mounting 17-17a which swingably mounts the combined electric motor and drive shaft assembly 12 to the base 11. A partial height back wall 18 extends upwardly from the bottom wall 14 and is attached at its opposing ends to the edges of the generally triangular side walls 16-16a. The combination of the floor 14, triangular side walls 16-16a and half height back retaining wall 18 define a shelf adapted for receiving and retaining a portable brake lathe, such as shown and described at U.S. Pat. No. 4,854,199.

The combination motor and drive shaft assembly 12 includes a yoke 20 which is pivotally mounted on base 11 at 17-17a Yoke 20 includes a U-shape frame having a flat base 21a which is adapted for mounting the electric motor 25 thereon by means of bolts 22—22 fed through apertures (not shown) positioned on the bottom wall. Base 21a also includes a larger central aperture (not shown) through which the electric motor output shaft (not shown) is positioned. The frame also has a pair of opposing side walls 21b-21c which extend vertically from the sides of base 21a and each include an aperture (not shown) adjacent the top thereof that aligns with respective apertures (not shown) on base sidewalls 16, 16a to provide a pivotal mounting at 17-17a for the electric motor drive shaft assembly on the portable base 11 when connected by nuts and bolts 23—23 and 23a—23a, respectively. A strengthening web 24 extends from the base walls 21a and is positioned between the side wall 21b and 21c in rigid connection therewith to provide added structural rigidity for the yoke.

Web 24 also rests upon a portion of the drive shaft assembly, namely a torque tube 26 which extends from the base wall 21a, perpendicularly outwardly of the end of electric motor 25. Torque tube 26 includes an end wall (not shown) which is perpendicular to the centerline of torque to be 26 and provides a mounting for a 90 degree gear box unit 27 sold under the trademark Dodge, which has an annular flange or collar 27a with an inner diameter smaller than the inner diameter of torque tube 26 so as to fit therein. A hand tightenable bolt 27b is positioned through torque tube 26 at slot 26a and secured in a threaded hole (not shown) in collar 27a, so as to secure the gear box in any desired rotational relation with respect to torque tube 26, such as shown in dotted line in FIG. 4. Gear box 27 is drivingly connected with the output shaft (not shown) of electric motor 26 by means of a first drive shaft 28 positioned down the middle and coaxial with torque tube 26 and drivingly connected with both the gear box 27 and the electric motor 25 by conventional couplings (not shown).

In the preferred embodiment, the output side of gear box 27 is positioned at 90 degrees to the input side of the gear box and includes a means for coupling a second drive shaft 30 to the output side of the gear box. Second drive shaft 30, which may be solid or flexible, is generally rod shaped, but it includes an output end 31 which is shaped as a regular polyhedron such as a four cornered cube type end or a six cornered hexagonal polyhedron-type end 31 (FIG. 4), which fits into a like shaped aperture 32 on an adjustable lug adapter, shown generally at 33, which is adapted to fit and be retained on a plurality of automobile wheel hub assemblies having either 3, 4, 5, 6, or 8 lugs.

The combination electric motor 25 and drive shaft assembly 12 is roughly substantially balanced around pivotal mountings 17-17a such that movement of the assembly around the pivotal mounting (shown at FIG. 3) is not largely reversed or changed by the forces of gravity. The motor and drive shaft assembly mounting may be selectably fixed or pivotable to any desired rotational position by tightening or loosening pivotal mounting nuts and bolts 23-23a. It should be noted that electric motor 25 contains a control box 34 which not only supplies electricity to the electric motor and provides for its control by switch 35, but which also provides a convenient electrical outlet 36, shown in FIG. 5, which is capable of providing a source of electric power for a portable brake lathe when in use, and a circuit breaker (not shown) which protects the electrical circuitry from overload.

OPERATION

Figure 2:
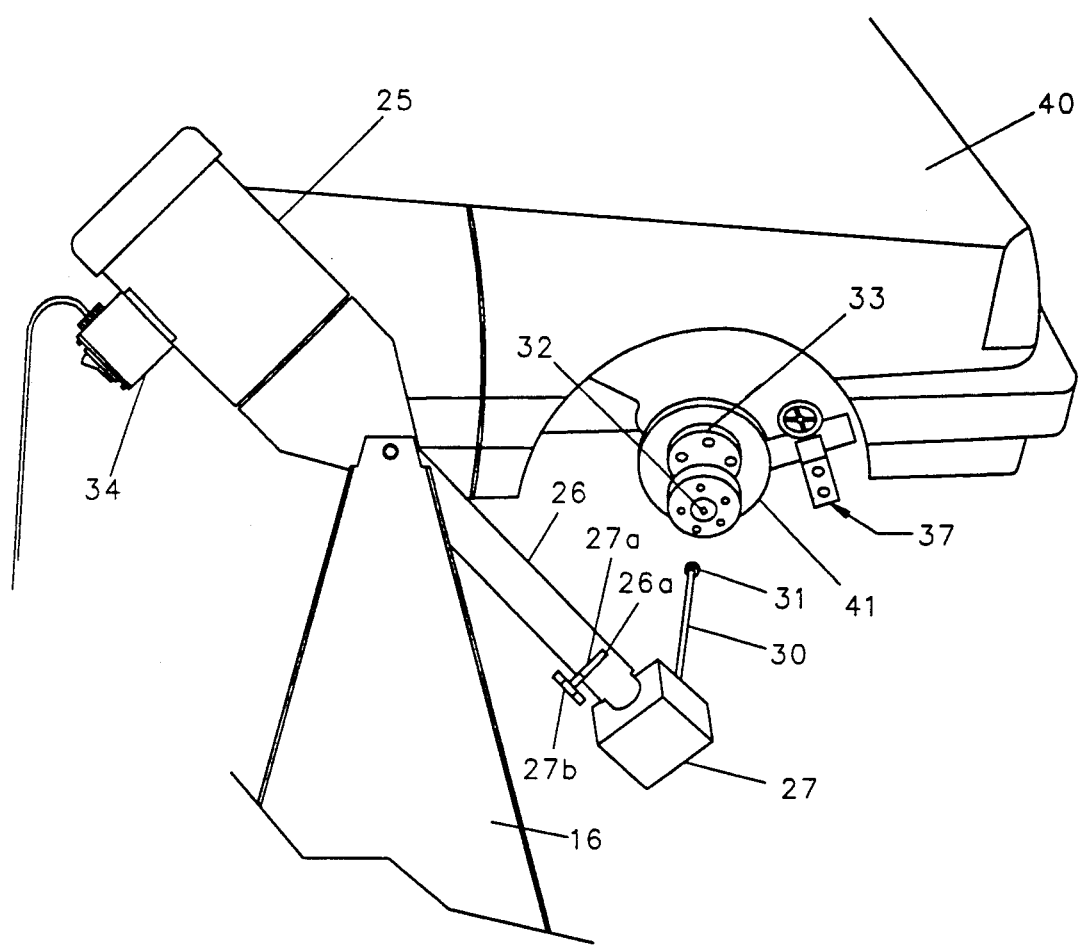
FIG. 2 is a fragmentary perspective view of the portable drive assembly shown in FIG. 1 as it appears when about to be mounted on a motor vehicle front wheel hub so as to rotate a disc brake rotor thereon.

Referring to FIGS. 1 and 2, the external driving assembly of the present invention 10 is shown as it appears when in a position to be mounted on an automobile front (or rear) wheel hub assembly. The portable brake lathe, shown generally at 37, is mounted on the brake caliper mounting bosses (not shown) which form a part of the front wheel drive assembly of automobile 40. The disc brake rotor 41 is shown in its mounted position with the lug adaptor 33 mounted on the stud bolts forming a portion of the wheel hub assembly. As shown in FIG. 2, the 90 degree angle of gear box 27 portion of the external drive assembly allows the unit to be moved to one side of the wheel hub assembly opposite that on which the portable brake lathe is mounted, for providing ease of the mechanic's access to the rotor 41 being resurfaced. The rotor drive unit 10 is wheeled up to the lug adapter 33 and the substantially balanced rotating combination electric motor 25 and drive shaft assembly 12 is rotated or tilted into a position where the distal end 31 of the second drive shaft 30 is in a position to be drivingly inserted in aperture 32 of the adjustable lug adapter 33. Once the second drive shaft 30 is in driving position, the hand bolt 27b may be tightened to obtain the proper driving position between the electric motor 25 and the lug adapter 33. Also the power cord for the portable brake lathe (not shown) may be fitted into the female plug 36 on the electric control 34 for the electric motor 25. With the portable brake lathe 37 and rotor drive unit 10 thus in mounted and working position, the rotor drive unit may be turned on to rotate the brake rotor 41 at a desired speed for operation of portable brake lathe 37 to resurface the sides or the rotor 41 in accordance with proper automotive maintenance practice.

Thus, an improved external drive assembly or rotor driving unit for use in connection with a portable brake lathe when resurfacing automotive disc brake rotors has been shown and described. While the present invention has been described in connection with one particular embodiment thereof, it will be understood by those skilled in the art that many changes may be made without departing from the true spirit and scope of the present invention. Therefore, the intention in the appended claims is to cover all such changes and modifications which come within the true spirit and scope of this invention.

The invention is claimed as follows:

1. In a portable drive assembly for providing external rotational power to a motor vehicle as desired, said drive assembly including,
   a drive unit having a motor thereon for providing rotational force and a drive shaft assembly in driven engagement with said motor for imparting rotational force output to said motor vehicle, and
   a portable base or stand on which said drive unit is adjustably mounted,
   an improvement comprising,
   a pivotal mounting on said drive unit with at least a substantial portion of said motor being mounted on one side of said pivotal mounting, and at least a substantial portion of said drive shaft assembly being positioned on an opposing side of said pivotal mounting substantially balancing said motor and said drive shaft assembly about said pivotal mounting such that said drive shaft may be manually moved to a desired height and said drive shaft will remain at said desired height while rotational motion is imparted to said vehicle, said pivotal mounting being adjustable for providing movement of said drive unit in a first plane, said drive shaft assembly including selectably adjustable means for changing the axis of rotation of rotational force output of said drive unit outside of said first plane, and through a fixed angle relative to a principal axis of said drive shaft, and means positioned below said base or stand for reducing resistance to movement of said base or stand along a floor.

2. The drive assembly as defined in claim 1 wherein said drive shaft assembly includes a first drive shaft couplingly engaged to an output shaft on said motor, and said selectably adjustable means for changing the direction of rotational force output includes a substantially right angled gear box driven by an output end of said first drive shaft.

3. The drive assembly as defined in claim 2 further including a tubular member extending from an output of said motor to a position adjacent said output end of said drive shaft, annular collar means extending from said gear box in mating relation with said tubular member for providing rotational engagement therebetween, and locking means for selectively locking and releasing aid gear box against rotation relative to said collar means.

4. The drive assembly as defined in claim 1 wherein said base includes a generally rectangular bottom wall, a pair of spatially related upstanding walls extending generally upwardly from opposing sides of said rectangular bottom wall, each spatially upstanding wall including means adjacent a top thereof for pivotally receiving and retaining said drive unit thereon.

5. In a portable drive assembly for providing external rotational power to a motor vehicle disk brake rotor mounted thereon, said drive assembly including:

a drive unit having a motor thereon for providing rotational force and a drive shaft assembly in driven engagement with said motor for imparting rotational force output to said disk brake rotor of said motor vehicle, and a portable base or stand on which said drive unit is adjustably mounted, an improvement comprising, a pivotal mounting on said drive unit with at least a substantial portion of said motor being mounted on one side of said pivotal mounting, and at least a substantial portion of said drive shaft assembly being positioned on an opposing side of said pivotal mounting substantially balancing said motor and said drive shaft assembly about said pivotal mounting such that said drive shaft may be manually moved to a desired height and said drive shaft shall remain at said desired height while rotational motion is imparted to said disk brake rotor, said pivotal mounting being adjustable for providing movement of said drive unit in a first plane, said drive shaft assembly including selectably adjustable means for changing the axis of rotation of rotational force output of said drive unit outside of said first plane, and through a fixed angle relative to a principal axis of said drive shaft, and means positioned below said base or stand for reducing resistance to movement of said base or stand along a floor.

6. A portable drive assembly in accordance with claim 2 and further including locking means for locking said gear box against rotation about said principal axis of said drive shaft.

* * * * *

UNITED STATES PATENT AND TRADEMARK OFFICE
CERTIFICATE OF CORRECTION

PATENT NO. : 5,265,486
DATED : November 30, 1993
INVENTOR(S) : Hartman et al

It is certified that error appears in the above-identified patent and that said Letters Patent is hereby corrected as shown below:

In column 3, line 6, after "17a" insert --.--

In column 5, line 35, beginning of the line delete "aid" and substitute -- said --.

Signed and Sealed this

Fourteenth Day of June, 1994

Attest:

BRUCE LEHMAN

Attesting Officer

Commissioner of Patents and Trademarks